(No Model.)
A. A. BROWN.
SELF LOCKING NUT.
No. 525,837. Patented Sept. 11, 1894.
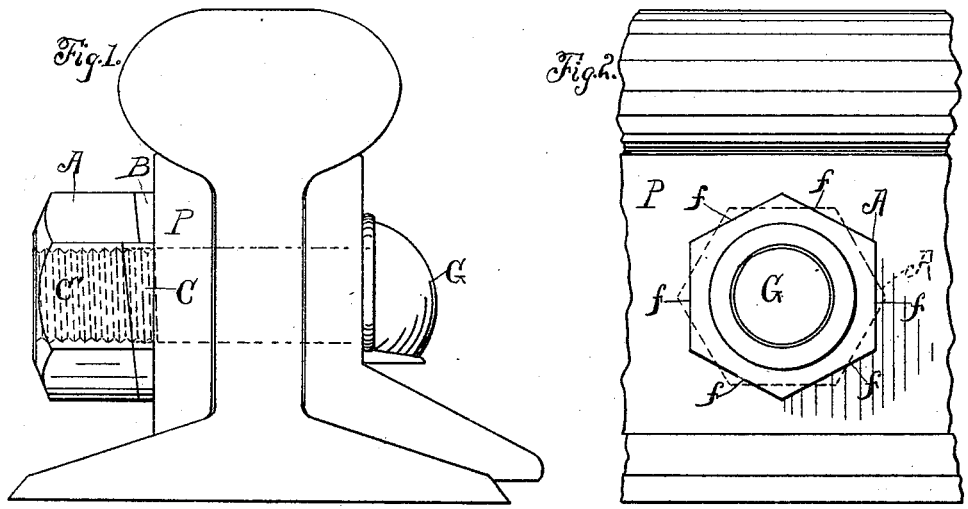
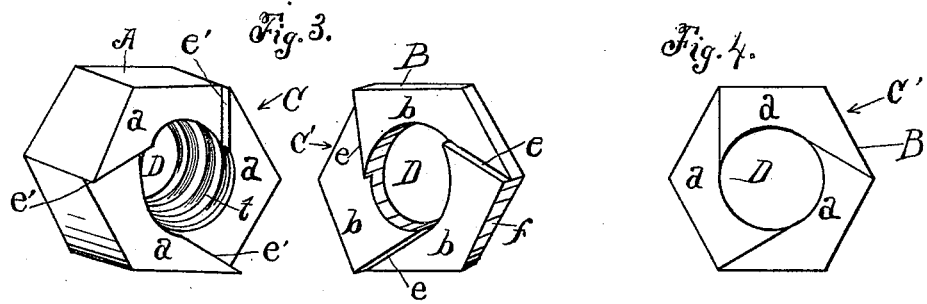
Witnesses.
M. M. Gee.
Alfred D. Townsend
Inventor
Alfoard Abel Brown
by Edzard D. Townsend
his Att

UNITED STATES PATENT OFFICE.

ALFOARD A. BROWN, OF SAN FRANCISCO, ASSIGNOR, BY DIRECT AND MESNE ASSIGNMENTS, OF ONE-HALF TO ORAMEL J. MUCHMORE AND DANIEL P. N. LITTLE, OF LOS ANGELES, CALIFORNIA.

SELF-LOCKING NUT.

SPECIFICATION forming part of Letters Patent No. 525,837, dated September 11, 1894.

Application filed March 10, 1892. Serial No. 424,360. (No model.)

*To all whom it may concern:*

Be it known that I, ALFOARD ABEL BROWN, a citizen of the United States, residing at San Francisco, in the county of San Francisco and State of California, have invented new and useful Improvements in Self-Locking Nuts, of which the following is a specification.

My invention relates especially to those self-locking nuts consisting of two members provided with oppositely arranged cam faces adapted to engage with each other to prevent the rotation of the members independent of each other. The great objection to devices of this kind heretofore has arisen from the fact that in screwing the nut home upon the bolt, there is great liability of splitting the washer by reason of the manner in which the force is applied to the offsets upon the washer. This has necessitated the use of washers of considerable thickness to prevent splitting the washer and this thickness is objectionable for many reasons.

The object of my invention is to provide an improved nut of this character in which both members combined will be of substantially no greater thickness than an ordinary nut and washer, and in which all liability of bursting the washer while screwing the nut home upon the bolt is avoided.

The accompanying drawings illustrate my invention.

Figure 1 is a side view of one form of my improved nut applied to a fish joint bolt in place upon its fish plate and rail. Fig. 2 is an end view of the same. Fig. 3 is a perspective view of my improved nut with its threaded and unthreaded members separated to exhibit their cam faces. Fig. 4 is a plan view illustrating the construction of the cam faces.

The principal feature of my invention consists of the arrangement of the offsets of cam faces with relation to the bolt hole of the nut, whereby the operation of the force exerted to screw the nut home upon the bolt tends to drive the unthreaded member or washer toward and around the bolt and not outward and away from the bolt as heretofore, thereby avoiding the danger of splitting the unthreaded member or washer, even when made of very thin metal.

In the drawings A indicates the threaded member of my improved nut, which threaded member is provided with the inclined cam face C which is arranged inclined away from the direction of rotation of the nut when such nut is screwed upon the bolt.

B indicates the washer or unthreaded member, the cam face C' of which is inclined in the direction of rotation of the nut while being screwed upon the bolt, and is complementary to the inclined face C of the nut A. The inclined face C of the unthreaded member or washer B terminates at its end in an offset $e$ which has its face arranged tangential to the bolt hole D of such member while the offset $e'$ at the end of the face C of the nut A is complementary to the offset $e$.

P represents the bolt plate against which the nut is screwed.

In practice the unthreaded member B is placed upon the bolt G and the threaded member A, which is provided with screw threads $t$ is screwed upon the bolt as shown in Fig. 1. The several facets of the cam faces, which facets are indicated by $a\ a\ a$ and $b\ b\ b$, and the offsets $e$ and $e'$ are complementary to each other; and the offsets $e'$ of the threaded member A engage with the offsets $e$ of the unthreaded member B and such unthreaded member is thereby forced to turn on the bolt as the threaded member is tightly screwed home thereupon. I do not claim the combination of a threaded and unthreaded member provided with cam faces and complementary offsets to be broadly new. By arranging the offsets $e$ as shown tangential with the bolt hole D the pressure upon such offsets of the washer is thus brought to operate to compress a portion of the washer toward or against the bolt thus to drive the washer around the bolt without any liability of splitting from undue outward strain. This will be fully understood by referring to Fig. 4.

The unthreaded member B is smooth upon its under side, and the perimeters $f$ of the unthreaded member, and of the threaded member are equal and correspond in shape so that a wrench may be applied simultaneously to both the unthreaded and threaded members when the nut is screwed home upon the bolt and it may also be applied to both members when it is desired to remove the nut from the bolt. If the threaded member starts to unscrew from the bolt the cam faces $a$ and $b$ engage and jam the nut upon the unthreaded member in the ordinary manner of lock-nuts of this class.

I am aware that it is old to provide a nut and a washer with cam facets and I am also aware that it is old to provide a washer with cutting edges arranged tangential to the bolt hole and presented toward the direction of rotation of the nut while being screwed upon the bolt, so that when the nut is screwed home upon the bolts such tangential edges will bite into the base of the nut to prevent it being unscrewed therefrom, but such construction possesses the defect of bringing the strain upon the washer in a direction which is outward from the bolt when force is applied to unscrew and the washer is liable to be split by such pressure, thus preventing its use a second time. The essential point of difference between my invention and the former construction is that in my device the offsets upon the washer are arranged to bring the strain upon the washer in such a manner as to operate to compress the washer upon the bolt and to drive it around the bolt, and although the base of my said washer is smooth, the nut can be tightened so forcibly that it will not become loosened accidentally, and yet a wrench may be applied to both the washer and nut simultaneously and they may be removed in the ordinary way from the bolt without being in any manner injured, so that they may be used repeatedly.

Now, having described my invention, what I claim as new, and desire to secure by Letters Patent, is—

The nut comprising the unthreaded member provided with the cam facets inclined in the direction of rotation of the nut while being screwed upon the bolt, such facets each terminating at its end in an offset which has its face arranged tangential to the bolt hole, and the threaded member provided with the cam facets and offsets arranged complementary to the facets and offsets of the unthreaded member, whereby the unthreaded member is prevented from splitting while the nut is being screwed home upon the bolt; substantially as and for the purpose set forth.

A. A. BROWN.

Witnesses:
JAMES R. TOWNSEND,
ALFRED I. TOWNSEND.